(12) United States Patent
Funaki et al.

(10) Patent No.: US 12,182,492 B2
(45) Date of Patent: Dec. 31, 2024

(54) DOCUMENT PROCESSING METHOD, AND INFORMATION PROCESSING DEVICE

(71) Applicant: LEGALON TECHNOLOGIES, INC., Tokyo (JP)

(72) Inventors: Ruka Funaki, Tokyo (JP); Shinsuke Mori, Tokyo (JP); Kohei Suenaga, Tokyo (JP); Yusuke Nagata, Tokyo (JP)

(73) Assignee: LEGALON TECHNOLOGIES, INC., Tokyo (JP)

( * ) Notice: Subject to any disclaimer, the term of this patent is extended or adjusted under 35 U.S.C. 154(b) by 0 days.

(21) Appl. No.: 18/107,639

(22) Filed: Feb. 9, 2023

(65) Prior Publication Data

US 2023/0186012 A1    Jun. 15, 2023

Related U.S. Application Data

(63) Continuation of application No. PCT/JP2020/030589, filed on Aug. 11, 2020.

(51) Int. Cl.
*G06F 40/106* (2020.01)
*G06F 40/166* (2020.01)

(52) U.S. Cl.
CPC .......... *G06F 40/106* (2020.01); *G06F 40/166* (2020.01)

(58) Field of Classification Search
CPC .... G06F 40/106; G06F 40/166; G06F 40/211; G06F 40/30; G06F 40/279
See application file for complete search history.

(56) References Cited

U.S. PATENT DOCUMENTS

| | | | |
|---|---|---|---|
| 2003/0033173 A1* | 2/2003 | Suzuki | G06Q 40/08 705/4 |
| 2004/0135805 A1* | 7/2004 | Gottsacker | G06F 40/103 715/751 |
| 2006/0010148 A1* | 1/2006 | Sattler | G06F 40/143 |

(Continued)

FOREIGN PATENT DOCUMENTS

| JP | 2012-208547 A | 10/2012 |
|---|---|---|
| JP | 6290459 | 2/2018 |

OTHER PUBLICATIONS

Kazuki Kawashima, et al.; Extraction of Significant Clauses from Software License Agreement; May 12, 2014,JSAI Conference; pp. 1-15 (Year: 2014).*

(Continued)

*Primary Examiner* — Phenuel S Salomon
(74) *Attorney, Agent, or Firm* — Sterne, Kessler, Goldstein & Fox P.L.L.C.

(57) ABSTRACT

A document processing method comprising: receiving document information from a terminal; and outputting associated information obtained by associating a subject element and a defining element with each other, and associating the defining element and a limiting element with each other based on the content of the document information, the subject element being a character string representing a subject extracted from a character string of the document information, the defining element being a character string defining an operation and/or a state of the subject, and the limiting element being a character string limiting a content of the defining element.

16 Claims, 13 Drawing Sheets

(56) References Cited

U.S. PATENT DOCUMENTS

| | | | | |
|---|---|---|---|---|
| 2007/0180359 A1* | 8/2007 | Giannetti | ............. | G06F 40/154 |
| | | | | 715/234 |
| 2008/0320412 A1* | 12/2008 | Wake | ................... | G06F 3/0486 |
| | | | | 715/781 |
| 2019/0197639 A1* | 6/2019 | Sugaya | ................ | G06F 40/169 |
| 2021/0256097 A1* | 8/2021 | Jayaraman | ............. | G06N 5/046 |

OTHER PUBLICATIONS

Kimiyoshi Machii et al.; Development of an Evaluation System of English Contract Documents, Jul. 15, 2010, IEICE Technical report; vol. 110; pp. 1-6. (Year: 2010).*

International Search Report directed to related International Patent Application No. PCT/JP2020/030589, mailed Nov. 17, 2020, 2 pages.

Kawashima, Kazuki et al., "Extraction of significant clauses from Software License Agreement", Proceedings of the 28th Conference of the Japanese Society for Artificial Intelligence, Proceedings of the 2014 JSAI Conference (28th), 5 pages.

Machii, Kimiyoshi et al., "Development of an Evaluation System of English Contract Documents", IEICE Technical Report, Jul. 15, 2010, vol. 110, No. 142, pp. 1-6.

Funaki, Ruka et al., "A Contract Corpus for Recognizing Rights and Obligations", Proceedings of the 26th Annual Conference of the Association for Natural Language Processing, Mar. 2020, pp. 1551-1554.

Funaki, R. et al., "A Contract Corpus for Recognizing Rights and Obligations", Proceedings of the 12th Language Resources and Evaluation Conference. European Language Resources Association, May 11, 2020, pp. 2045-2053.

Funaki, Ruka et al., "Recognizing Rights and Obligations in Contracts", Proceedings of the 34th National Conference of the Japanese Society for Artificial Intelligence, Jun. 9, 2020, pp. 1-4.

* cited by examiner

FIG.4

| ELEMENT ID | DETAILS OF ELEMENT | RANGE OF TEXT | TYPE OF ELEMENT |
|---|---|---|---|
| 001 | Legal Force, Inc. | (l2,c3) (l2,c14) | Party Concerned |
| 002 | in good faith according to the laws, regulations, custom, and the like... | (l54,c1) (l56,c12) | Obligation |
| 003 | in case that a circumstance not stipulated in the Agreement has arisen | (l53,c1) (l53,c19) | Condition |
| ⋮ | ⋮ | ⋮ | ⋮ |

FIG.5

| SUBJECT ELEMENT ID | DEFINING ELEMENT ID | LIMITING ELEMENT ID |
|---|---|---|
| 001 | 002 | |
| | 002 | 003 |
| | 002 | 004 |
| ⋮ | ⋮ | ⋮ |
| 001 | 015 | |
| | 015 | 020 |
| ⋮ | ⋮ | ⋮ |

| | | | Condition |
|---|---|---|---|
| P1 Legal Force Sales, Inc. | Obligation | Should have discussion in good faith according to the laws, regulations, custom, and the like for solving purposes. | In case that a circumstance not stipulated in the Agreement has arisen |
| | | | When a question has arisen in connection with the interpretation of the Agreement |
| | | The dispute between the two parties shall be subject to the exclusive jurisdiction of the Tokyo Summary Court or the Tokyo District Court in the first instance. | When a dispute between the two parties has arisen in connection with the Agreement, and has not been settled through the discussion stipulated in the preceding article |
| | Right | Right | Condition |
| | | Right | Condition |
| | | Should hold confidential information disclosed or provided by the other party strictly in confidence | None |
| | | Must not disclose or leak confidential information including the existence of the Agreement to a third party, and must not copy, reproduce, or alter the confidential information. | Unless a written consent of the other party has been previously obtained |
| | | Must not use confidential information disclosed or provided by the other party for purposes other than the examination of investment for the other party. | None |
| | | Must immediately return to the other party the entire original document and its copy (which are returnable) of confidential information disclosed or provided by the other party, and must immediately return to the other party the entire copy (if the original document is not returnable) of the confidential information. | If requested by the other party after the expiration of the Agreement |
| P2 Dai Nippon Purchase | Obligation | Must take necessary measures, such as discarding or deleting, with the consent of the other party. | If the original document and its copy are not returnable |
| | | Should provide compensation for the damages caused to the other party. | If damages are caused to the other party due to violation of the provisions of the Agreement |
| | | Should have discussion in good faith according to the laws, regulations, custom, and the like for solving purposes. | In case that a circumstance not stipulated in the Agreement has arisen |
| | | | When a question has arisen in connection with the interpretation of the Agreement |
| | | The dispute between the two parties shall be subject to the exclusive jurisdiction of the Tokyo Summary Court or the Tokyo District Court in the first instance. | When a dispute between the two parties has arisen in connection with the Agreement, and has not been settled through the discussion stipulated in the preceding article |
| | Right | Right | Condition |
| | | Right | Condition |

View of Legal Force Sales, Inc. | View of Dai Nippon Purchase

Requirements of Both Parties: Obligations, Rights of the Other Party, Rights, Obligations of the Other Party Subject of Contract: P1
Basic Sales Transaction Agreement (Buyer Friendly)
The Seller, Legal Force Sales, Inc. (hereinafter, the "Seller") and the buyer, Dai Nippon Purchase (hereinafter, the "Buyer") hereby enter into the following Basic Sales Transaction Agreement (hereinafter, the "Agreement") regarding the purchase and sale of the products stipulated in Article 1 between the Seller and the Buyer.

Article 1 (Target Products)
The target products of the Agreement (hereinafter, the "Products") include the following.
1. ABC
2. XYZ
3. Other products separately designated by the Buyer Article 2 (Basic Agreement)
1. The Agreement shall apply to all sales contracts for the Products between two parties including the Seller and the Buyer (hereinafter, "Individual Contracts").
2. When terms and conditions different from those in the Agreement are determined in the Individual Contract, the Individual Contract shall supersede the Agreement.

Article 3 (Individual Contract)
1. The Individual Contract shall be established when the Buyer has sent the Seller a written request describing the name, the number of pieces, the unit price, the total price, the delivery date, the delivery point, and other necessary matters of the Products, and the Seller has agreed to the request.
2. If the Buyer does not receive a notice of agreement from the Seller within two business days after the Buyer has sent the Seller the written request of the preceding paragraph, it is deemed that the Seller has agreed to the request of the Buyer, and the Individual Contract is established with the passage of the period.
3. The provisions of the preceding Paragraph 2 do not prevent other alternative methods from being determined based on the discussion held between the Seller and the Buyer.

FIG.9

Consultancy Service Engagement Agreement

Legal Force Sales, Inc. (hereinafter, the "Settlor") and Dai Nippon Purchase (hereinafter, the "Trustee") hereby enter into the following Consultancy Service Engagement Agreement (hereinafter, the "Agreement").

1. (Objective of the Agreement)
The Settlor shall entrust the implementation of consultancy services related to xxx managed by the Settlor (hereinafter, the "Services") to the Trustee, and the Trustee shall be entrusted with the Services.

2. (Details of the Services)
1. The Services entrusted to the Trustee by the Settlor include the services stipulated in the following sub-paragraphs, and the details of the services shall be determined in writing between the Settlor and the Trustee through separate discussion.
  1. Services related to xxx
  2. Services related to yyy
  3. Any other services incidental to the preceding sub-paragraphs
2. The Trustee shall be able to request the Settlor to hold discussion with the Trustee to change the rules that the Trustee should obey for the implementation of the Services at any time whenever necessary for the implementation of the Services.

3. (Compensation and Payment Method)
[Charge Calculated on Hourly Basis]
1. The compensation for the Services is ___ Yen (not including the consumption tax) per hour.
2. The Trustee shall issue an invoice at the end of each month, and the Settlor shall pay the compensation for the Services of the month to the bank account designated by the Trustee by the end of the next month of the due date specified in the invoice.
It should be noted that the Settlor shall be liable for the bank fee.

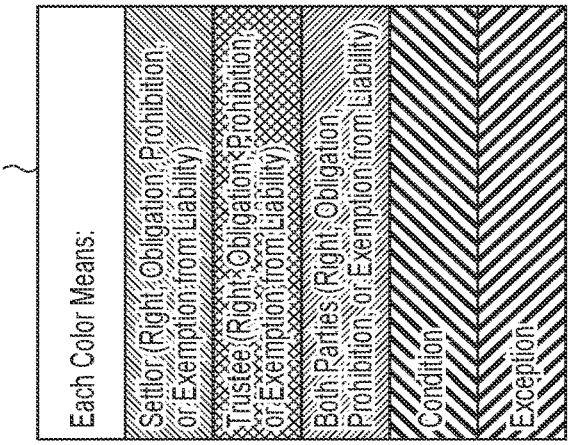

Each Color Means:
- Settlor (Right, Obligation, Prohibition, or Exemption from Liability)
- Trustee (Right, Obligation, Prohibition, or Exemption from Liability)
- Both Parties (Right, Obligation, Prohibition, or Exemption from Liability)
- Condition
- Exception

FIG. 10

Each Color Means:
- Settlor (Right, Obligation, Prohibition, or Exemption from Liability)
- Trustee (Right, Obligation, Prohibition, or Exemption from Liability)
- Both Parties (Right, Obligation, Prohibition, or Exemption from Liability)
- Condition
- Exception 3. When the Settlor requests the Trustee to produce deliverables, or when a service not stipulated in the Agreement has occurred, the Settlor shall pay the Trustee the compensation based on the discussion separately held between the two parties in addition to the compensation stipulated in Paragraph 1.

[Charge Calculated on Monthly Basis]
1. The compensation for the Services is _____ Yen (not including the consumption tax) per month.
2. The Trustee shall issue an invoice at the end of each month (the compensation shall be calculated on a pro rata basis if the Trustee has provided the Services to a Settlor for a period of less than one month), and the Settlor shall pay the Trustee the compensation for the Services of the month via a direct deposit to the bank account designated by the Trustee by the end of the next month [or the due date specified in the invoice]. It should be noted that the Settlor shall be liable for the bank fee.
3. When the Settlor requests the Trustee to produce deliverables, or when a service not stipulated in the Agreement has occurred, the Settlor shall pay the Trustee the compensation based on the discussion separately held between the two parties in addition to the compensation stipulated in Paragraph 1.

[Charge Calculated on Project Basis]
1. The compensation for the Services is _____ Yen (not including the consumption tax).
2. The Trustee shall issue an invoice after the completion of the Services, and the Settlor shall pay the Trustee the compensation via a direct deposit to the bank account designated by the Trustee by the end of the next month [or the due date specified in the invoice] of the reception of the invoice [or the due date specified in the invoice]. It should be noted that the Settlor shall be liable for the bank fee.
3. When the Settlor requests the Trustee to produce deliverables, or when a service not stipulated in the Agreement has occurred, the Settlor shall pay the Trustee the compensation based on the discussion separately held between the two parties in addition to the compensation stipulated in Paragraph 1.

[Charge Calculated on Milestone Basis]
1. The total compensation for the Services is _____ Yen (not including the consumption tax).
2. The payment method is based on the following conditions.
1. _____ Yen (not including the consumption tax) shall be paid (as an advance payment) in conclusion of the Agreement.
2. _____ Yen (not including the consumption tax) shall be paid (as an intermediate payment) when xxx.
3. _____ Yen (not including the consumption tax) shall be paid (as a success fee) when xxx.
3. The Trustee shall issue an invoice at the time point of each of the preceding subparagraphs, and the Settlor shall pay the Trustee the compensation for the Services to the bank account designated by the Trustee by the end of the next month following the date of reception of the invoice [or the due date specified in the invoice].

FIG.11

104d₁ — Each Color Means:
- Obligation of Seller
- Right of Seller
- Obligation of Buyer
- Obligation of Both Parties
- Prohibition of Buyer
- Prohibition of Both Parties Note: Conditions and exception conditions are underlined.

---

104d₂ Basic Sales/Transaction Agreement (Buyer Friendly)

The seller ABC Company (hereinafter, the "Seller") and XYZ company (hereinafter, the "Buyer") hereby enter into the following Basic Sales Transaction Agreement (hereinafter, the "Agreement") regarding the sales transaction of the products stipulated in Article 1 between the Seller and the Buyer.

104d₃

Article 1 (Target products)
The target products of the Agreement (hereinafter, the "Products") include the following. However, the Seller shall be able to change the details of the Products through discussion with the Buyer.
1. xxxx
2. yyyy
3.

104d₄

Article 2 (Basic Agreement)
1. The Agreement shall apply to all sales contracts for the Products between two parties including the Seller and the Buyer (hereinafter, the "Individual Contracts").
2. In case that terms and conditions different from those in the Agreement are determined in the Individual Contract, the Individual Contract shall supersede the Agreement.

Article 3 (Individual Contract)
1. The Individual Contract shall be established when the Buyer has sent the Seller a written request describing the matters determined by the Seller, including the name, the number of pieces, the unit price, the delivery date, the delivery point, and other necessary matters of the Products, and the Seller has issued a notice of agreement to the request.
2. If the Seller does not issue a notice of agreement to the Buyer within 10 business days after the Buyer has sent the Seller the written request of the preceding paragraph, the request of the Buyer becomes ineffective.
3. The provisions of the preceding Paragraph 2 do not prevent other alternative methods from being determined based on the discussion held between the Seller and the Buyer.

Article 4 (Delivery)
The Seller shall deliver the Products to the Buyer at the delivery point determined by the Individual Contract on the delivery date determined by the Individual Contract.

Article 5 (Inspection)    104d₆    104d₅
1. The Buyer must inspect the Products within two business days when the Buyer has received the Products.
2. When the Buyer finds that the Products do not comply with the Individual Contract with regard to the type, the quality, the number of pieces, or the like through the inspection of the preceding paragraph, or finds any other defects (hereinafter, the "Defects, etc."), the Buyer must send a notice to that effect to the Seller during the period of the preceding paragraph.
3. In the case of the preceding paragraph, if the Buyer does not send the notice to the Seller within the period, the Buyer shall not be able to demand the Seller to fulfill the warranty against the Defects, etc.

104d₇
104d₈

Article 6 (Transfer of Ownership)    104d₉
The ownership of the Products shall be transferred to the Buyer from the Seller when the payment for the Products is complete.

Article 7 (Risk of Loss)    104d₁₀
The Seller shall be liable for any loss, damage, or any other risks related to the Products except when there is any reason attributable to the Buyer regarding those that have occurred before the delivery, and the Buyer shall be liable for any loss, damage, or any other risks related to the Products except when there is any reason attributable to the Seller regarding those that have occurred after the delivery.

104d₁₁

Article 8 (Payment of Cost)    104d₁₂
The Buyer shall pay for the Products delivered by the end of each month via direct deposit to the bank account designated by the Seller by the 15th of the next month (or the following business day of the financial institution if it falls on a non-business day). It should be noted that the Buyer shall be liable for the bank fee.

104d₁₃    104d₁₄

Article 9 (Confidentiality)
1. The Seller and the Buyer must not disclose or leak any confidence of the other party regarding its business and technology, which has been known through the Agreement or the Individual Contract (hereinafter, the "Confidential Information") to a third party during the validity period of the Agreement, and even after the Agreement has expired.
2. The Confidential Information do not include information corresponding to any of the following sub-paragraphs.
   (1) Publicly known information or information known to the public for reasons not attributable to the Seller or the Buyer
   (2) Information already held at a time point when it is disclosed by the other party.

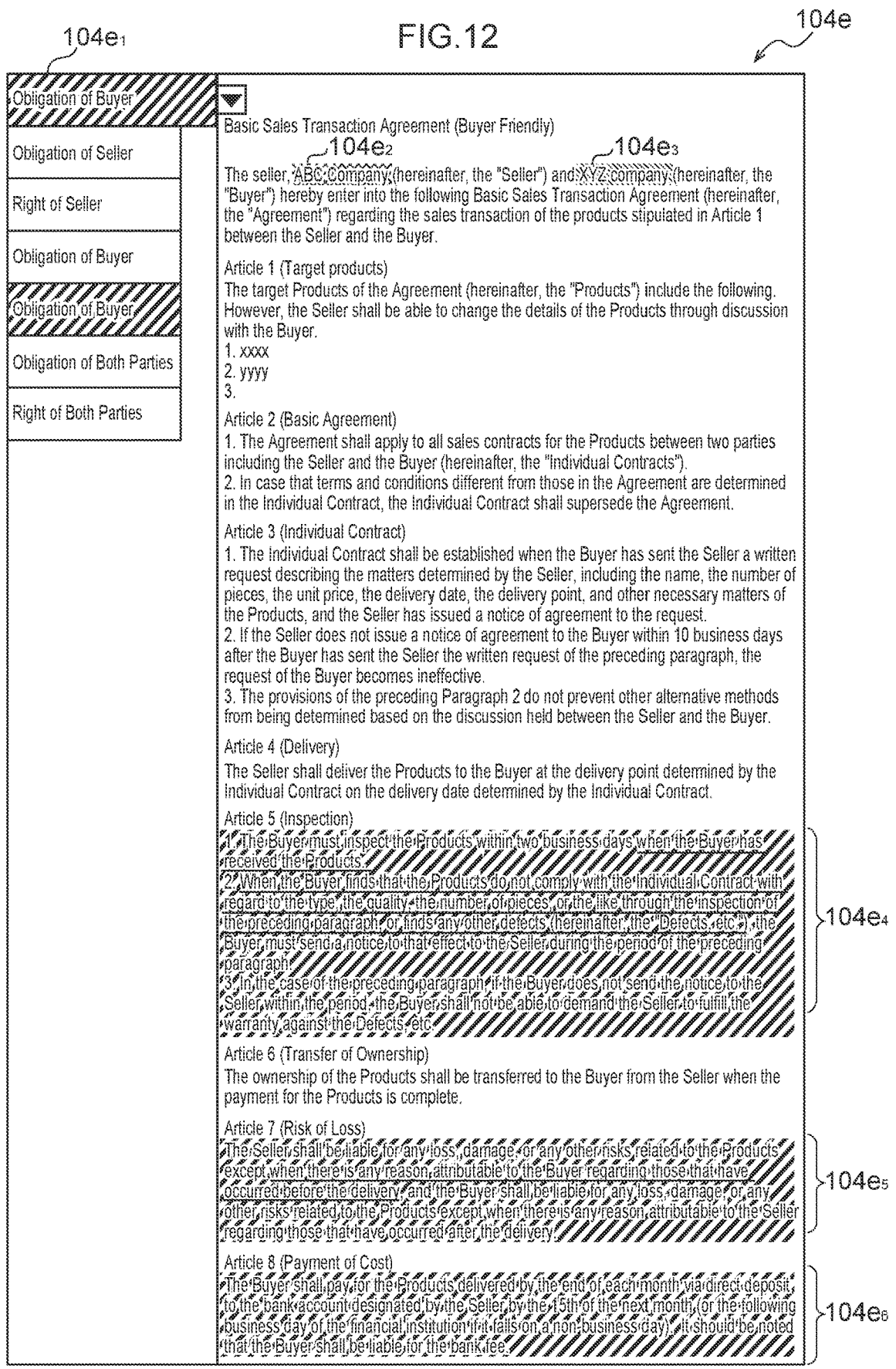

DOCUMENT PROCESSING METHOD, AND INFORMATION PROCESSING DEVICE

CROSS-REFERENCE TO RELATED APPLICATION

The present application is a bypass continuation application based on and claims the benefit of priority from PCT Application No. PCT/JP2020/030589 filed Aug. 11, 2020, the entire contents of which are incorporated herein by reference.

TECHNICAL FIELD

The present disclosure relates to a document processing method, and an information processing device.

BACKGROUND

As a conventional technique, an information processing device has been proposed that determines a possible risk of a sentence included in a contract, and assists in checking the contract (for example, see Japanese Patent Application Laid-Open No. 2012-208547).

In the information processing device disclosed in Japanese Patent Application Laid-Open No. 2012-208547, a sentence decomposing unit decomposes a sentence included in contract data, and extracts an object, a predicate, and a modifier included in the sentence, and if a combination of the extracted object and predicate is included in a signal object/signal predicate combination table and the extracted modifier is included in a signal modifier/risk table, a risk determination unit determines a risk corresponding to the modifier from the signal modifier/risk table.

SUMMARY

An aspect of the invention according to the present disclosure is a document processing method comprising: receiving document information from a terminal; and outputting associated information obtained by associating a subject element and a defining element with each other, and associating the defining element and a limiting element with each other based on the content of the document information, the subject element being a character string representing a subject extracted from a character string of the document information, the defining element being a character string defining an operation and/or a state of the subject, and the limiting element being a character string limiting a content of the defining element.

BRIEF DESCRIPTION OF DRAWINGS

FIG. 4 is a schematic view illustrating an exemplary structure of element information.

FIG. 5 is a schematic view illustrating an exemplary structure of associated information.

FIG. 8 is a schematic view illustrating an exemplary display of a display control unit.

FIG. 9 is a schematic view illustrating an exemplary display of the display control unit.

FIG. 10 is a schematic view illustrating an exemplary display of the display control unit.

FIG. 11 is a schematic view illustrating an exemplary display of the display control unit.

FIG. 12 is a schematic view illustrating an exemplary display of the display control unit.

DESCRIPTION

According to the information processing device disclosed in Japanese Patent Application Laid-Open No. 2012-208547, although a risk is determined based on the signal object/signal predicate combination table and the signal modifier/risk table and is then presented to the user, information stored in the signal object/signal predicate combination table and the signal modifier/risk table are those registered in advance, and thus, information not registered in advance cannot be presented to the user, which may be problematic. Further, the information processing device disclosed in Japanese Patent Application Laid-Open No. 2012-208547 is configured to determine a risk, but cannot present information for grasping the content of a contract, which may be problematic.

In view of the foregoing conventional technique, an object of the present disclosure is to provide a document processing program, an information processing device, and a document processing method that are easier to use.

According to various embodiments of the present disclosure, a document processing program, an information processing device, and a document processing method that are easier to use can be provided.

Embodiment (Configuration of Document Processing System)

Figure 1:
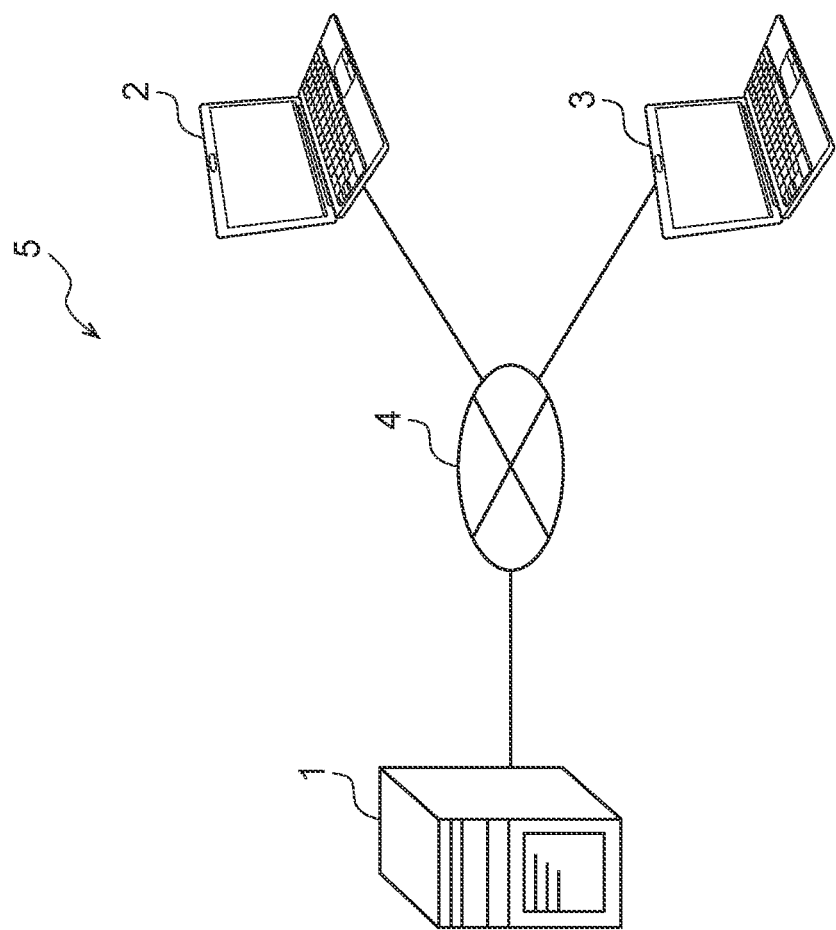
FIG. 1 is a schematic view illustrating an exemplary configuration of a document processing system according to an embodiment.

FIG. 1 is a schematic view illustrating an exemplary configuration of a document processing system according to an embodiment.

A document processing system 5 may include a document processing server device 1, a terminal 2, and a terminal 3 that are connected via a network 4 in a communicable manner. The terminal 2 may be operated by a user who wants to create, check, and/or review a document, for example, and the terminal 3 may be operated by another user who wants to create, check, and/or review the document. The user of the terminal 2 and the user of the terminal 3 may handle a contract as document information, for example, and repeatedly check, modify, and approve the content of the contract until they reach an agreement. The document processing system 5 may be mainly used for one of the users to grasp the content of document information created by the other user during the checking operation. The document processing system 5 may also be used for one of the users to check the content of document information created by himself/herself.

The document processing server device 1 may be a server-type information processing device that operates in response to requests from the terminal 2 and the terminal 3, and may include electronic components, such as a CPU (Central Processing Unit) with a function of processing information, an HDD (Hard Disk Drive), and a flash memory, within the body of the document processing server device 1. The document processing server device 1 may be a plurality of information processing devices that operate in a cooperative manner, or may be an information processing device operated through a given cloud service. Alternatively, the function of the document processing server device 1 may be implemented within the terminal 2 and/or the terminal 3.

Each of the terminal 2 and the terminal 3 may be an information processing device, such as a PC (Personal Computer) or a tablet terminal, and include electronic components, such as a CPU with a function of processing information and a flash memory, within the body of the terminal.

The network 4 may be a communication network that allows for high-speed communication, and is a wired communication network, such as the Internet, intranet, or LAN (Local Area Network); or a wireless communication network, for example.

In such a configuration, for example, a document to be processed by the document processing server device 1 is a document in the legal field, such as a contract, and one or both of the users is a person who is not a legal expert but needs to create a contract, or a person who is a legal expert, such as a lawyer, and has the knowledge of creating contracts. Alternatively, one or both of the users is a staff member of a sales department in a company or a staff member of a legal department in a company, for example.

An example of the basic operation is as follows. First, the terminal 2 or the terminal 3 may upload document information to the document processing server device 1. Then, the terminal 2 and the terminal 3 may request the document processing server device 1 to analyze the content of the document information therein, and then may check the results of analysis on the display units of the terminal 2 and the terminal 3.

In the present embodiment, the document processing server device 1 may mainly extract from document information the ranges of character strings as element information, and may associate the elements of the element information with each other based on the content of the document information, and then may present information on the relationship between the elements to one or both of the users. The elements of the element information herein may include a subject element that is a character string representing the subject of a sentence, a defining element that is a character string (which is often a verb phrase or a predicate, but there may also be other cases) defining the operation and/or the state of the subject, and a limiting element that is a character string limiting the operation and/or the state of the defining element. When the document information is a contract, for example, the subject element may be a party concerned et al. (which may include a third party or an uncertain person) who makes a contract, and the defining element may be a right of the party concerned, an obligation with which the party concerned should comply, prohibition (i.e., non-possession of rights), exemption from liability (i.e., non-possession of obligations), compensation for damages included in an obligation, or the like. The limiting element is a condition, an exception, a period (i.e., a duration), or the like that limits the content of the right, the obligation, or the like.

The party concerned may be a person with a proper name as a subject (which may also be an uncertain person without a proper name). The obligation may include a maximum of one verb phrase including a phrase "must do . . . ," "should do . . . ," or "is to do . . . " at the beginning, for example (if a plurality of verb phrases are connected with a conjunction, the respective phrases may be separated). The right may include a maximum of one verb phrase including a word or a phrase "can," "may," or "be allowed to" at the beginning, for example (if a plurality of verb phrases are connected with a conjunction, the respective phrases may be separated). Each of the obligation and the right may include a grammatical unit other than a verb phrase as long as such a grammatical unit may define the operation and/or the state of the subject. The condition may include one or more clauses including a phrase "when . . . ," "if . . . ," or "in the case . . . " at the beginning, for example. The exception may include one or more clauses including a phrase "this shall not apply when . . . " or "except when . . . " at the beginning, for example. Embodiments will be described hereinafter.

Although one terminal 2 and one terminal 3 are illustrated in the drawing, more than one terminal 2 and more than one terminal 3 may be connected to the network 4. Similarly, more than one user may operate each of such terminals.

(Configuration of Document Processing Server Device)

Figure 2:
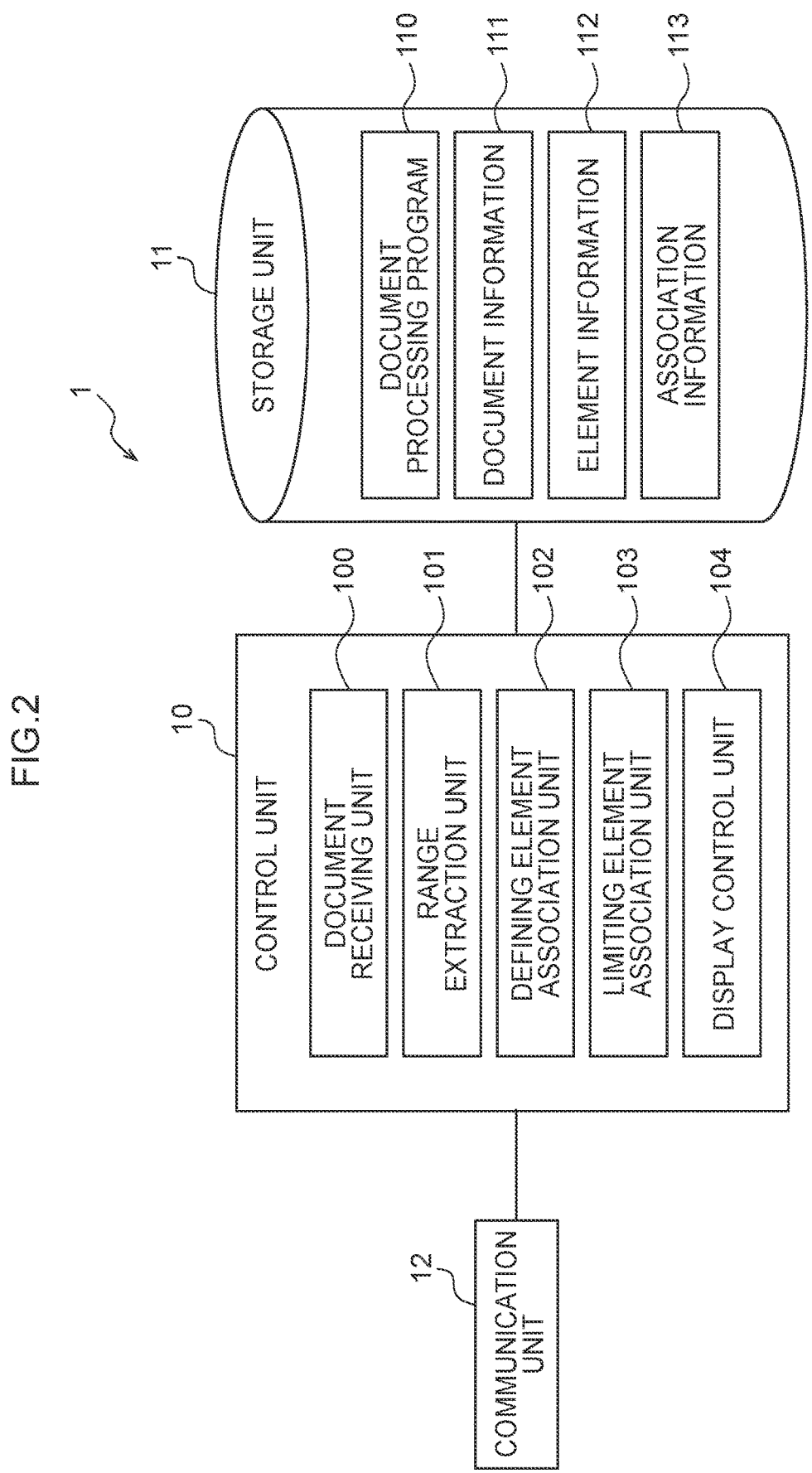
FIG. 2 is a block diagram illustrating an exemplary configuration of a document processing server device 1 according to an embodiment.

FIG. 2 is a block diagram illustrating an exemplary configuration of the document processing server device 1 according to an embodiment.

The document processing server device 1 may include a control unit 10, which includes a CPU and the like, and controls each unit and also executes various programs; a storage unit 11, which includes a storage medium, such as a flash memory, and stores information; and a communication unit 12 functioning as a communication interface for communicating with the outside via the network 4.

The control unit 10 may include a processor, such as a CPU, and may electrically connected to the storage unit 11 including the memory and to the communication unit 12 functioning as the communication interface. The control unit 10 may function as a document receiving unit 100, a range extraction unit 101, a defining element association unit 102, a limiting element association unit 103, a display control unit 104, and the like by executing a document processing program 110 described below.

The document receiving unit 100 may receive a contract as the document information 111 from the terminal 2 or the terminal 3, and then may store the contract in the storage unit 11.

The range extraction unit 101 may extract from a character string of the document information 111 a subject element that is the range of a character string representing a subject, a defining element that is the range of a character string defining the operation and/or the state of the subject, and a limiting element that is the range of a character string limiting the operation and/or the state of the defining element, and then may store the extracted elements as element information 112 in the storage unit 11. Specific examples of the extraction will be described later.

The defining element association unit 102 may associate, among the elements of the element information 112, the subject element and the defining element with each other based on the content of the document information 111, and may record the resulting information as associated information 113. Specific examples of the association will be described later.

The limiting element association unit 103 may associate, among the elements of the element information 112, the defining element and the limiting element with each other based on the content of the document information 111, and may record the resulting information as the associated information 113. Specific examples of the association will be described later.

The display control unit 104 may display the document information 111, the element information 112, and the associated information 113 in the storage unit 11 as well as the output result of each of the units 100 to 103 on the display units of the terminal 2 and the terminal 3 in a controlled manner, using a predetermined method. The display method will be described in detail later.

The storage unit 11 may include a memory, such as a flash memory, and may be electrically connected to the control unit 10 including the processor and the like and to the communication unit 12 functioning as the communication interface. The storage unit 11 may store the document processing program 110, which allows the control unit 10 to operate as each of the foregoing units 100 to 104, the document information 111, the element information 112, the associated information 113, and the like.

Figure 3:
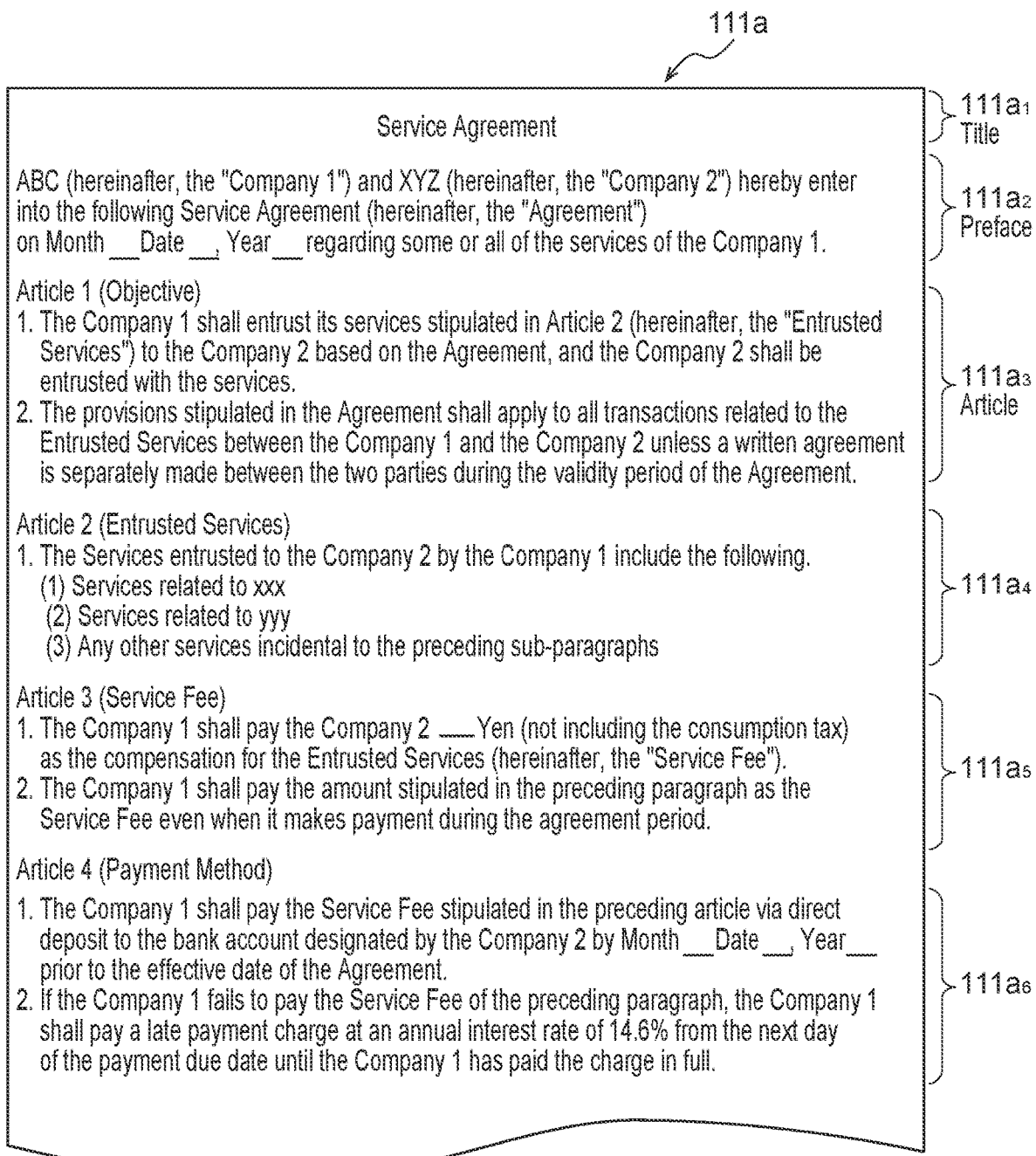
FIG. 3 is a schematic view illustrating an exemplary structure of document information.

FIG. 3 is a schematic view illustrating an exemplary structure of the document information 111.

Document information 111a may be a contract, for example, and may include a title $111a_1$, a preface $111a_2$, and a plurality of articles (i.e., article units) $111a_3$, $111a_4$, $111a_5$, $111a_6$ .... Each of the articles (i.e., article units) $111a_3$, $111a_4$, $111a_5$, $111a_6$ ... may include a plurality of further smaller units, such as paragraphs and sub-paragraphs, obtained through splitting. The document information 111a may also be parse based on a plurality of units according to the content of the contract.

FIG. 4 is a schematic view illustrating an exemplary structure of the element information 112.

The element information 112 may include the element ID for identifying an element, the details of the element, the range of text indicating the positional information of the element in the document information 111, and the type of the element indicating which type (e.g., a party concerned, an obligation, a right, or a condition) the element belongs.

FIG. 5 is a schematic view illustrating an exemplary structure of the associated information 113.

The associated information 113 may include a subject element ID as the element ID of a subject element, a defining element ID as the element ID of a defining element, and a condition element ID as the element ID of a condition element. The associated information 113 may include an item of the element information 112 instead of or in addition to each ID.

Next, operations in a first embodiment, which include (1) a basic operation, (2) an operation of extracting information, and (3) an operation of displaying the extracted information, will be individually described. Hereinafter, an operation performed with the terminal 2 will be described, and if a similar operation is performed when the terminal 2 is replaced with the terminal 3, the description of such operation will be omitted.

(1) Basic Operation

First, a user may operate the terminal 2 to log into a service provided by the document processing server device 1. The terminal 2, upon receiving an input of information, such as a user ID and password, from the user, may send to the document processing server device 1 the information as well as an authentication request.

The document processing server device 1, upon receiving the information, such as the user ID and password, as well as the authentication request from the terminal 2, may refer to user information including user IDs and passwords registered in advance so as to authenticate the requester as the user.

(2) Operation of Associating Elements with Each Other

Figure 13:
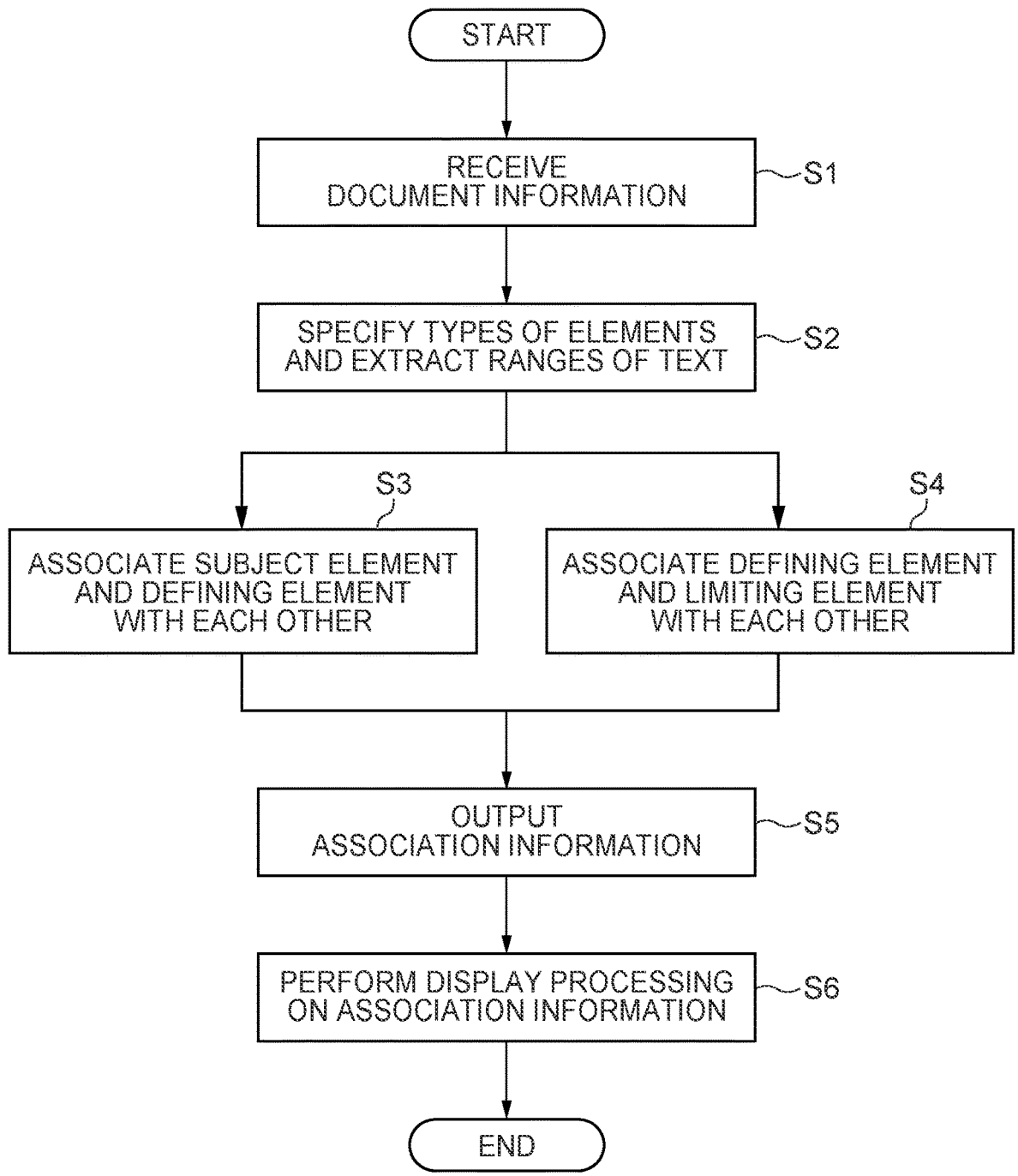
FIG. 13 is a flowchart illustrating an operation of associating elements with each other with the document processing server device.

FIG. 13 is a flowchart illustrating an operation of associating elements with each other with the document processing server device 1 of the present embodiment.

Next, the user, upon logging into the service, may operate the terminal 2 to upload document information of a contract to the document processing server device 1. Then, the terminal 2 may upload the document information to the document processing server device 1.

The document receiving unit 100 of the document processing server device 1 may receive the document information 111 from the terminal 2 operated by the requester, and then may store the document information 111 in the storage unit 11 (S1).

Next, the user may operate the terminal 2 to select the desired document information 111 to be analyzed from the uploaded document information 111. The terminal 2 may send a request to the document processing server device 1 to analyze the document information 111.

The range extraction unit 101 of the document processing server device 1, upon receiving the request to analyze the document information 111, may extract from a character string of the document information 111 a subject element that is a character string representing a subject, a defining element that is a character string defining the operation and/or the state of the subject, and a limiting element that is a character string limiting the operation and/or the state of the defining element, and then may store the extracted elements as the element information 112 in the storage unit 11 (S2). The extraction may be performed by, for example, setting a party concerned as the subject element, setting a right and an obligation as the defining element, and setting a condition and an exception as the limiting element, and then performing prediction using a BIO (Begin-Inside-Outside) label learned with a BILSTM-CRF (Bidirectional Long Short Term Memory-Conditional Random Field). For example, machine learning based on a CRF (Conditional Random Field) or the like, or a rule-based method may be used.

For example, as illustrated in FIG. 4, the element information 112, which has been obtained by identifying the range of text (e.g., the range defined by the paragraph number, the line number, or the character number) in the document information 111 and the type of each element, may be extracted. For example, a description "LegalForce, Inc." may be extracted from the range of text: line 2, the third character to line 2, the 14th character of the document information 111, and may be identified as a party concerned element as the subject element. In addition, a description "in good faith according to the laws, regulations, custom, and the like . . . " may be extracted from the range of text: line 54, the 1st character to line 56, the 12th character of the document information 111, and may be identified as an obligation element as the defining element. Further, a description "in case that a circumstance not stipulated in the Agreement has arisen" may be extracted from the range of text: line 53, the 1st character to line 53, the 19th character of the document information 111, and may be identified as a condition element as the limiting element.

Next, the defining element association unit 102 of the document processing server device 1 may associate, among the elements of the element information 112, the subject element and the defining element with each other, and may record the resulting information as the associated information 113 (S3). Subject elements and defining elements may have a many-to-many relationship (i.e., a group of parties concerned vs. a group of rights/obligations). Thus, logistic regression may be used, for example, and binary classification may be performed on all combinations to perform association. If many-to-many association is possible, other association methods, such as a search technique, may be used.

In addition, the limiting element association unit 103 of the document processing server device 1 may associate, among the elements of the element information 112, the defining element and the limiting element with each other, and then may record the resulting information as the associated information 113 (S4). Defining elements and limiting elements may have a many-to-many relationship (i.e., a group of rights/obligations vs. a group of conditions/exceptions). Thus, logistic regression may be used, for example, and binary classification may be performed on all combinations to perform association. If many-to-many association is possible, other association methods, such as a search technique, may be used.

A pruning process may be performed in the process of associating the defining element and the limiting element with each other. The pruning process may be performed based on the number of characters, an article, a paragraph, a sub-paragraph, a line, a sentence, or the like as a unit, and if the distance between the character positions of the elements is determined to be longer than a predetermined distance based on the unit, association may not be performed on such elements. Further, the pruning process may also be performed in the process of associating the subject element and the defining element with each other. Either one of step S3 or step S4 may precede the other, or the steps may be performed at the same time.

For example, as illustrated in FIG. 5, the associated information 113, which defines the relationship between the respective elements, may be recorded. For example, text "LegalForce, Inc." corresponding to the subject element ID "O01" and text "in good faith according to the laws, regulations, custom, and the like . . . " corresponding to the defining element ID "O02" may be associated with each other, and the text "in good faith according to the laws, regulations, custom, and the like . . . " corresponding to the defining element ID "O02" and text "in case that a circumstance not stipulated in the Agreement has arisen" corresponding to the limiting element ID "O03" may be associated with each other.

The associated information 113 may be represented not in a table form like the one illustrated in FIG. 5 but in a form obtained by adding annotations to the document information 111, for example. The following annotations may include "P" representing a party concerned, "R" representing a right, "O" representing an obligation, "C" representing a condition, and "E" representing an exception.

Figure 6:
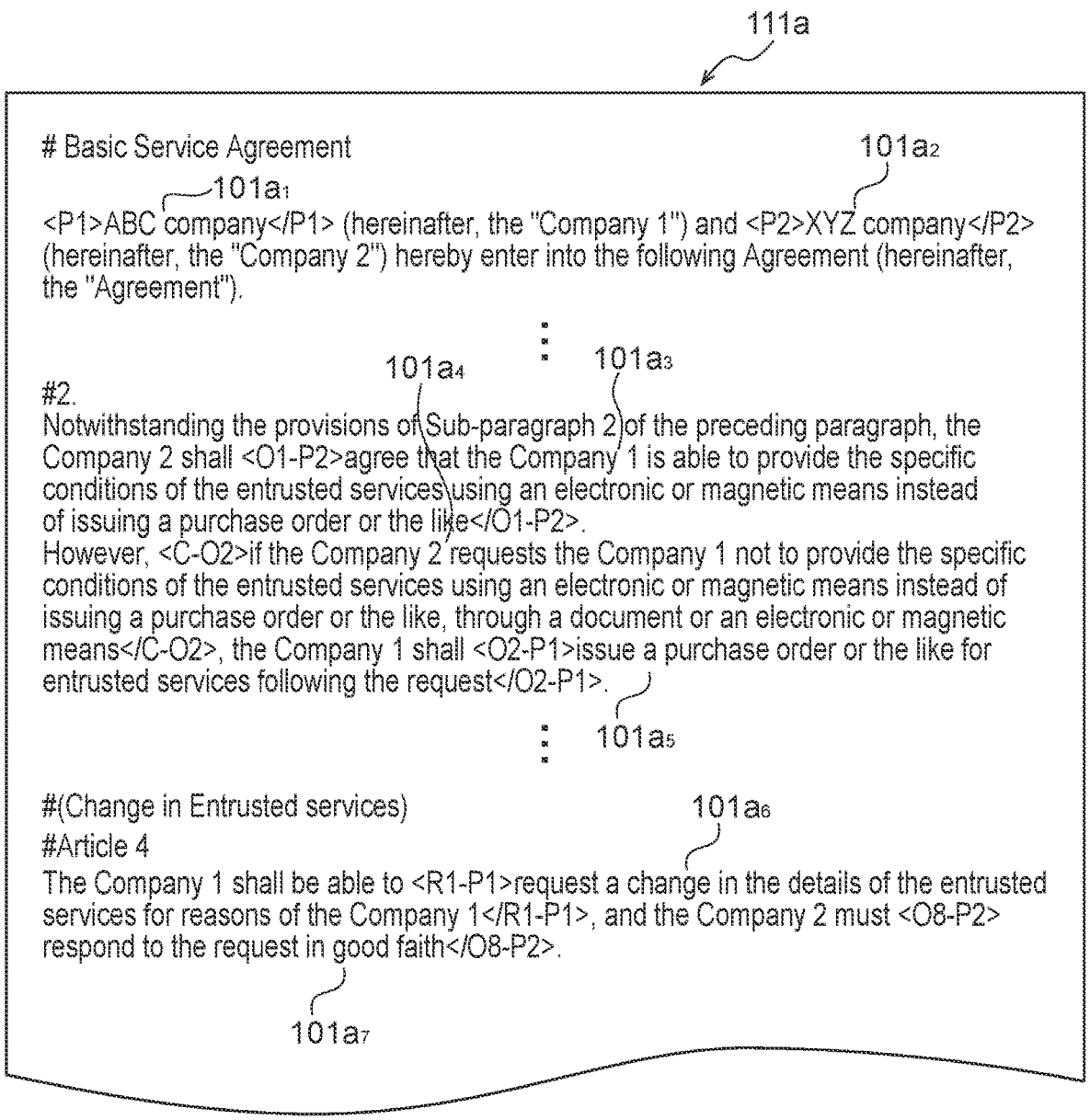
FIG. 6 is a schematic view illustrating the structure of document information including annotations added thereto.

FIG. 6 is a schematic view illustrating an example of structure of the document information 111 including annotations added thereto.

"<P1>" and "</P1>" added to the start point and the end point, respectively, of a range $101a_1$ may be annotations indicating a first subject element. "<P2>" and "</P2>" added to the start point and the end point, respectively, of a range $101a_2$ may be annotations indicating a second subject element.

"<O1-P2>" and "</O1-P2>" added to the start point and the end point, respectively, of a range $101a_3$ may be annotations indicating a first obligation-defining element associated with the second subject element. "<C-O2>" and "</C-O2>" added to the start point and the end point, respectively, of a range $101a_4$ may be annotations indicating a limiting element associated with the second defining element. "<O2-P1>" and "</O2-P1>" added to the start point and the end point, respectively, of a range $101a_5$ may be annotations indicating a second obligation-defining element associated with the first subject element.

"<R1-P1>" and "</R1-P1>" added to the start point and the end point, respectively, of a range $101a_6$ may be annotations indicating a first right-defining element associated with the first subject element. "<O8-P2>" and "</O8-P2>" added to the start point and the end point, respectively, of a range $101a_7$ may be annotations indicating an eighth obligation-defining element associated with the second subject element.

Annotations can be similarly inserted into contracts written in languages other than Japanese. For example, annotations may be added to a contract written in English as follows.

Figure 7:
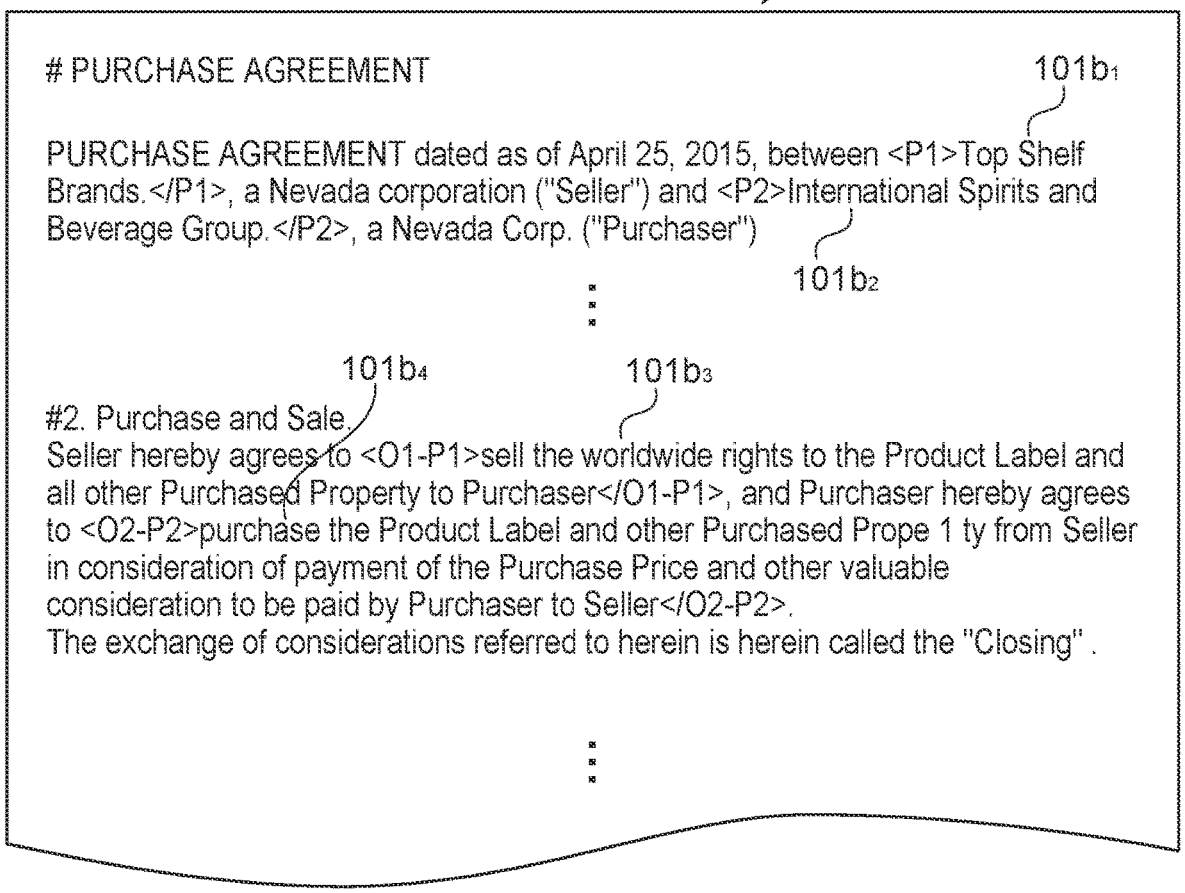
FIG. 7 is a schematic view illustrating the structure of document information including annotations added thereto.

FIG. 7 is a schematic view illustrating an example of structure of the document information 111 including annotations added thereto.

"<P1>" and "</P1>" added to the start point and the end point, respectively, of a range $101b_1$ may be annotations indicating a first subject element. "<P2>" and "</P2>" added to the start point and the end point, respectively, of a range $101b_2$ may be annotations indicating a second subject element.

"<O1-P1>" and "</O1-P1>" added to the start point and the end point, respectively, of a range $101b_3$ may be annotations indicating a first obligation-defining element associated with the first subject element. "<O2-P2>" and "</O2-P2>" added to the start point and the end point, respectively, of a range $101b_4$ may be annotations indicating a second obligation-defining element associated with the second subject element.

Next, the document processing server device 1 may output the associated information 113 to the display control unit 104 (S5). The document processing server device 1 may output the associated information 113 to the outside, and the output associated information 113 may be used by an external device.

Next, the display control unit 104 may perform display processing on the associated information 113, for example, and may display a screen like the one described below on the display unit of the terminal 2 (S6).

FIG. 8 is a schematic view illustrating an exemplary display of the display control unit 104.

A screen 104a may include buttons $104a_1$ and $104a_2$ for switching a party concerned, a display field $104a_3$ for displaying the content of the document information 111, and a display field $104a_4$ for displaying the content of the associated information 113 in a table form. The display field $104a_3$ may have an emphasized display function such as those illustrated in FIGS. 9 to 12 described below.

The display field $104a_4$ may display, for each subject element (a party concerned 1 or 2), a defining element (i.e., an obligation or a right) associated with the subject element, and a limiting element (i.e., a condition) associated with each defining element, and may display the relationship between the respective elements in a list form.

As another example, the display control unit 104 may perform display processing on the associated information 113, and may display a screen like the one described below on the display unit of the terminal 2.

FIG. 9 is a schematic view illustrating an exemplary display of the display control unit 104.

A screen $104b$ may include a legend block $104b_1$ including legends shown in different colors (which are expressed as different types of hatching for convenience's sake of the patent drawing), for example, and also may include a party concerned $104b_2$ as a settlor, a party concerned $104b_3$ as a trustee, a condition $104b_4$, a defining element $104b_5$ of the trustee, a defining element $104b_5$ of the trustee, a defining element $104b_7$ of the settlor, and a defining element $104b_8$ of the settlor, each highlighted in a different color in contrast to the content of the document information 111 displayed in a text form. Each element may be displayed in a different font, a different size, a different type of hatching, italic font, underline, or rubi characters, for example, other than the different color.

FIG. 10 is a schematic view illustrating an exemplary display of the display control unit 104.

A screen $104c$ may include a legend block $104c_1$ including legends shown in different colors, for example, and also includes a condition $104c_2$, an obligation $104c_3$ of a settlor, an obligation $104c_4$ of a trustee, obligations $104c_5$ and $104c_5$ of the settlor, conditions $104c_7$ and $104c_8$, an obligation $104c_9$ of the settlor, an obligation $104c_{10}$ of the trustee, an obligation $104c_{11}$ of the settlor, conditions $104c_{12}$ and $104c_{13}$, an obligation $104c_{14}$ of the settlor, an obligation $104c_{15}$ of the trustee, and an obligation $104c_{15}$ of the settlor, each highlighted in contrast to the content of the document information 111 displayed in a text form.

In each of the screens $104b$ and $104c$, each element may be displayed in a different color in contrast to the document information 111 so that the relationship between the respective elements in the document information 111 is clarified.

As another example, the display control unit 104 may perform display processing on the associated information 113, and may display a screen like the one described below on the display unit of the terminal 2. The following example is different from FIG. 9 and FIG. 10 described above in that more specific legends are used.

FIG. 11 is a schematic view illustrating an exemplary display of the display control unit 104.

A screen $104d$ may include a legend block $104d_1$ including legends shown in different colors, for example, and may also include a party concerned $104d_2$ as a seller; a party concerned $104d_3$ as a buyer, an obligation $104d_4$ of the two parties, obligations $104d_5$, $104d_5$, $104d_7$ and $104d_8$ of the buyer, an obligation $104d_9$ of the seller, obligations $104d_{10}$ and $104d_{11}$ of the buyer, obligations $104d_{12}$ and $104d_{13}$ of the buyer, and an obligation $104d_{14}$ of the two parties, each highlighted in contrast to the content of the document information 111 displayed in a text form. Conditions and exception conditions included in the rights and the obligations may be underlined.

The screen $104d$ may include more specific elements in comparison with the screens $104b$ and $104c$, and the respective elements may be displayed in different colors in contrast to the document information 111 so that the relationship between the respective elements in the document information 111 is clarified.

As another example, the display control unit 104 may perform display processing on the associated information 113, and may display a screen like the one described below on the display unit of the terminal 2.

FIG. 12 is a schematic view illustrating an exemplary display of the display control unit 104.

A screen $104e$ may include a pull-down menu $104e_1$ for selecting a desired item to be highlighted, a party concerned $104e_2$ as a seller, a party concerned $104e_3$ as a buyer, and obligations $104e_4$, $104e_5$, and $104e_5$ of the buyer that are highlighted in contrast to the content of the document information 111 displayed in a text form when "Obligation of Buyer" is selected.

In the screen $104e$, the selected element "Obligation of Buyer" may be highlighted in an emphasized manner in contrast to the document information 111 so that the relationship between the respective elements in the document information 111 is clarified. Conditions included in the highlighted display may be underlined. In addition, conditions and exception conditions included in the rights and the obligations may be underlined.

Advantageous Effects of Embodiment

According to the foregoing embodiment, a subject element, a defining element, and a limiting element may be extracted from the document information 111, and the extracted subject element, defining element, and limiting element may be associated with each other based on the content of the document information 111 so that the associated information 113 may be obtained, and then, the associated information 113 may be displayed in a controller manner in a table form or through marking, for example. Therefore, even when a word not corresponding to information registered in advance is used, it is possible to present information for grasping the content of a contract. Since contracts are written in a form including sentences, certain knowledge and experience have been required to grasp the types of rights and obligations that each party concerned has as well as the types of conditions included in the rights and the obligations. In contrast, displaying elements in a table form or through marking, for example, can suppress the steps required to grasp the foregoing information and save time. In addition, switching the item to be marked can display only the selected item, which makes it possible to more easily grasp the content of the selected item in comparison with when the item to be marked is not switched.

Other Embodiments

The present invention is not limited to the foregoing embodiment, and can be modified in various ways within the scope of the present invention.

For example, the document information 111 may be a legal document or a document in other fields, such as an instruction manual. The present invention may be similarly applicable to such a document. In addition, the language of the document information 111 is not limited to Japanese or English, and the present invention is applicable to any other languages that can construct a sentence from which each element can be extracted. Each element is not limited to only the subject element, the defining element, or the limiting element, and may be a more specific element obtained by splitting each element into smaller pieces, or an element with a broader concept obtained by conceptualizing each element to a higher level, or may further include an element of a different type in addition to the foregoing elements.

In the foregoing embodiment, the function of each of the units 100 to 104 of the control unit 10 is implemented by a program, but some or all of the units may be implemented by hardware, such as an ASIC. Alternatively, the program used in the foregoing embodiment may be provided by being stored in a recording medium, such as a CD-ROM. Further, the order of the steps described in the foregoing embodiment may be changed, or one or more of the steps may be removed, or further, (an)other step(s) may be added.

[Notes]

The disclosed embodiment further discloses the following notes.

(Note 1)

A document processing program for causing a computer to function as association means for outputting associated information obtained by associating a subject element and a defining element with each other and associating the defining element and a limiting element with each other based on a content of document information, the subject element being a character string representing a subject extracted from a character string of the document information, the defining element being a character string defining an operation and/or a state of the subject, and the limiting element being a character string limiting a content of the defining element.

(Note 2)

The document processing program according to Note 1 above, for further causing a computer to function as display control means for displaying, based on the associated information, a relationship among the subject element, the defining element, and the limiting element in a table form.

(Note 3)

The document processing program according to Note 1 above, for further causing a computer to function as display control means for displaying, based on the associated information, a relationship among the subject element, the defining element, and the limiting element in an emphasized manner on a screen displaying the document information.

(Note 4)

The document processing program according to any one of Notes 1 to 3 above, in which the association means, in associating the subject element and the defining element with each other and associating the defining element and the limiting element with each other, does not perform association when a distance between character positions of the subject element and the defining element and a distance between character positions of the defining element and the limiting element are longer than a predetermined distance.

(Note 5)

The document processing program according to any one of Notes 1 to 4 above, in which the computer is connected to one or more terminals via a network in a communicable manner.

(Note 6)

The document processing program according to any one of Notes 1 to 5 above, in which the computer is connected to one or more terminals via a wireless communication network.

(Note 7)

An information processing device including association means for outputting associated information obtained by associating a subject element and a defining element with each other and associating the defining element and a limiting element with each other based on a content of document information, the subject element being a character string representing a subject extracted from a character string of the document information, the defining element being a character string defining an operation and/or a state of the subject, and the limiting element being a character string limiting a content of the defining element.

(Note 8)

An information processing device including a memory configured to store document information in addition to a predetermined instruction; and a processor configured to, based on the instruction stored in the memory, execute a process for outputting associated information obtained by associating a subject element and a defining element with each other and associating the defining element and a limiting element with each other based on a content of the document information, the subject element being a character string representing a subject extracted from a character string of the document information, the defining element being a character string defining an operation and/or a state of the subject, and the limiting element being a character string limiting a content of the defining element.

(Note 9)

A document processing method including an association step of outputting associated information obtained by associating a subject element and a defining element with each other and associating the defining element and a limiting element with each other based on a content of document information, the subject element being a character string representing a subject extracted from a character string of the document information, the defining element being a character string defining an operation and/or a state of the subject, and the limiting element being a character string limiting a content of the defining element.

What is claimed is:

1. A computer-implemented method for document processing, wherein the method comprises:
   one or more processors configured to:
   recognize at least some of associated information based on a machine learning model, wherein the associated information comprises a subject element, a defining element, and a limiting element from a character string of document information, and wherein,
   the subject element being a character string representing a subject extracted from a character string of the document information,
   the defining element being a character string defining an operation and/or or a state of the subject, and
   the limiting element being a character string limiting a content of the defining element;
   extract at least some of the associated information;
   associating the subject element and the defining element with each other;
   associating the defining element and the limiting element with each other;
   annotating each of the subject element, the defining element, and the limiting element;
   displaying on a first display field of a computer screen, the document information based on the annotating, and
   display on a second display field of the computer screen, a legend indicating what each of the subject element, the defining element, and the limiting element represent.

2. The computer-implemented method according to claim 1, one or more processors are configured to change a display mode according to the type of the associated information in the first display field.

3. The computer-implemented method according to claim 1, one or more processors are configured to display the associated information corresponding to a party concerned with the document information, and the associated information corresponding to another party concerned with the document information in different manners in the first display field.

4. The document processing method according to claim 1, one or more processors are configured to switch a display mode of the associated information based on a user's operation.

5. The computer-implemented method according to claim 4, wherein:
the switching is per party concerned.

6. The computer-implemented method according to claim 1, one or more processors are configured to display, based on the associated information, a relationship among the subject element, the defining element, and the limiting element in an emphasized manner on a screen displaying the document information in the first display field.

7. The computer-implemented method according to claim 1, wherein:
the association of the subject element and the defining element with each other, and the association of the defining element and the limiting element with each other are specified by not performing association when a distance between character positions of the subject element and the defining element, and a distance between character positions of the defining element and the limiting element are longer than a predetermined distance.

8. The document processing method according to claim 1, one or more processors are configured to connect to the computer screen to a network in a communicable manner.

9. The computer-implemented method according to claim 8, one or more processors are configured to connect to the computer screen via a wireless network connection.

10. An information processing device comprising:
one or more memories configured to store document information in addition to a predetermined instruction; and
one or more processors configured to:
recognize associated information in the stored document information based on a machine learning model, wherein the associated information comprises a subject element, a defining element, and a limiting element from a character string of document information, and wherein,
the subject element being a character string representing a subject extracted from a character string of the document information,
the defining element being a character string defining an operation or a state of the subject, and
the limiting element being a character string limiting a content of the defining element;
extract at least some of the associated information;
annotate each of the subject element, the defining element, and limiting element;
associate the subject element and the defining element with each other;
associate the defining element and the limiting element with each other;
display, on a first display field of a computer screen, the document information based on the annotating, and
display, on a second display field of the computer screen, a legend indicating what each of the subject element, the defining element, and the limiting element represent.

11. The information processing device according to claim 10, wherein the processor is further configured to change a display mode according to the type of the associated information in the first display field.

12. The information processing device according to claim 10, wherein the processor is further configured to display the associated information corresponding to a party concerned with the document information, and the associated information corresponding to another party concerned the document information in different manners in the first display field.

13. The information processing device according to claim 10, wherein the processor is further configured to switch a display mode of the associated information based on a user's operation.

14. The information processing device according to claim 13, wherein the switching is per party concerned.

15. The information processing device according to claim 10, wherein the processor is further configured to display, based on the associated information, a relationship among the subject element, the defining element, and the limiting element in an emphasized manner on the computer screen.

16. The information processing device according to claim 10, wherein the association of the subject element and the defining element with each other, and the association of the defining element and the limiting element with each other are specified by not performing association when a distance between character positions of the subject element and the defining element, and a distance between character positions of the defining element and the limiting element are longer than a predetermined distance.

\* \* \* \* \*